United States Patent
Busch et al.

(10) Patent No.: US 6,174,033 B1
(45) Date of Patent: Jan. 16, 2001

(54) METHOD AND DEVICE FOR DRIVING A PUMP OF A BRAKING SYSTEM

(75) Inventors: Gerd Busch, Gerlingen; Manfred Gerdes, Eberdingen-Hochdorf, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/306,128

(22) Filed: May 6, 1999

(30) Foreign Application Priority Data

May 9, 1998 (DE) .............................................. 198 20 884

(51) Int. Cl.[7] .................................. B60T 8/32; B60T 8/40; B60T 8/48; B60T 13/14; B60T 13/20
(52) U.S. Cl. ........................ 303/10; 303/116.1; 303/116.4
(58) Field of Search ............................... 303/116.4, 10–12, 303/122.12, 154–158, 116.1, DIG. 3, DIG. 4, 115.1, 116.2, 116.3; 701/71, 78, 83

(56) References Cited

U.S. PATENT DOCUMENTS 5,197,787 * 3/1993 Matsuda et al. ........................ 303/10

FOREIGN PATENT DOCUMENTS

| 195 04 295 | * | 8/1995 | (DE) . |
| 195 27 805 | * | 3/1996 | (DE) . |
| 195 35 623 | * | 4/1996 | (DE) . |
| 195 46 682 | * | 6/1997 | (DE) . |
| 195 48 248 | * | 6/1997 | (DE) . |
| 196 10 863 | * | 9/1997 | (DE) . |

* cited by examiner

Primary Examiner—Douglas C. Butler
(74) Attorney, Agent, or Firm—Kenyon & Kenyon

(57) ABSTRACT

A method and a device which are used for forming and/or adapting a driving signal of an arrangement for delivering a pressurized medium in a braking system. The driving signal, in particular, of a pump of a braking system, is a function of at least one driving signal and/or the formation of the driving signal of a shut-off device, in particular, of at least one valve, for the inlet and/or outlet and/or passage of the pressurized medium. A delivery rate of the pump is adapted in a manner compatible with the situation, including the valve position resulting from the driving signal and/or its formation and/or the prevailing pressure ratios.

16 Claims, 4 Drawing Sheets

METHOD AND DEVICE FOR DRIVING A PUMP OF A BRAKING SYSTEM

FIELD OF THE INVENTION

The present invention relates to a method and a device for forming and/or adapting a driving signal for driving a pump to deliver a pressurized medium of a braking system. Contained in the braking system under discussion are shut-off devices, in particular, valves for the inlet and/or outlet and/or passage of the pressurized medium, as well as, optionally, further means delivering the pressurized medium, in particular, optionally, at least one further pump for adjusting a pressure in the pressurized medium.

BACKGROUND INFORMATION

Conventional braking systems come in many variations. Such a braking system has at least one brake circuit, in which is arranged at least one means delivering the pressurized medium, particularly, in the case of a hydraulic braking system, for example, one pump which is also designated as a return pump. In addition, provision can optionally be made for at least one further means delivering the pressurized medium, in particular, a self-priming charging pump which is connected by an intake line to a reservoir for the pressurized medium. The inlet and outlet of the pressurized medium into and out of the brake circuit, in the same way as the inlet and outlet of the pressurized medium into and out of the respective wheel-brake cylinder, are controlled by way of shut-off devices, in particular, valves for the inlet and/or outlet and/or passage of the pressurized medium. This is described, for example, in German Patent No. 195 46 682. This arrangement is also found in principle in an electrohydraulic braking system, as described in German Patent No. 195 48 248, in which the pressurized medium is fed to the valves or comes from the valves through a pump via an interposed pressure reservoir. In that case, the pressurized medium is fed into or let out of the wheel-brake cylinders by opening and closing the intake and discharge valves according to the braking input of the driver and/or the driving signals of a mediating logic such as, for example, of an antilock braking system, a traction control system, or a dynamic movement control system.

Thus, the basic described arrangement is equally fulfilled, for example, in a hydraulic braking system by a return pump with intake and discharge valves or by a charging pump with charging and selector valves, just as, for example, in an electrohydraulic braking system by a storage pump with intake and discharge valves.

This basic design is also fulfilled in any comparable arrangement composed of a means for delivering the pressurized medium, and shut-off devices, which can be allocated to the means, for the inlet and/or outlet and/or passage of the pressurized medium in a braking system.

A pump of a braking system is often driven on the basis of the evaluation of the pump rotational frequency or the rotational frequency of the motor actuating the pump. In so doing, either the rotational frequency is directly ascertained, or a variable representing the rotational frequency is used. In this context, the known methods are aimed at the correlation between the pump rotational frequency and the volume of pressurized medium delivered. Therefore, the pump is driven in a manner compatible with the delivery rate. An exact adaptation of this delivery rate to specific pressure ranges in the braking system is described in German Patent No. 195 48 248. In that case, different pressure ranges are subdivided by a plurality of pressure thresholds, and the pump operates with a different delivery rate in each pressure range.

In this method, the pump is driven as a function of the delivery rate, to suit the needs, so to speak, i.e., the build-up or reduction of pressure in the braking system is predefined by the braking input of the driver and/or a logic which processes the input. Dependent upon this, on one hand, one or more pumps and, in addition, the corresponding valves are driven. At the same time, to reduce the noise, the pump is driven by a clocked signal.

It has turned out that the indicated methods and the corresponding devices are not able to furnish optimal results in every situation. An object of the present invention is, on one hand, to produce a good pressure build-up dynamic in the lower pressure range and the very flat pressure-volume characteristic curve of a braking hydraulic existing in that range, and, on the other hand, to achieve a further reduction in noise, especially at the high pressure level as well.

SUMMARY OF THE INVENTION

The dependence of the driving signal of the pump, or the formation of this driving signal, on the driving signal of at least one shut-off device, in particular, of at least one valve and/or the formation of this driving signal, makes it possible to exactly adjust the driving of the pump to the position of the shut-off device. The use of different pump delivery rates, adapted to the prevailing pressure ratios and the valve position, permits a further reduction in noise compared to the Related Art, since great pressure pulsations as are caused, for example, when the pressurized medium is delivered against closed valves or valves which are open in a manner not compatible with the delivery rate, can be avoided.

In using several means for delivering the pressurized medium, in particular at least one charging pump and at least one return pump for the brake circuit, a coordination of the driving of the means for delivering the pressurized medium can be carried out, including the position of the shut-off device. This permits the delivery rate to be more exactly adapted to the respective situation.

DETAILED DESCRIPTION

Figure 1:
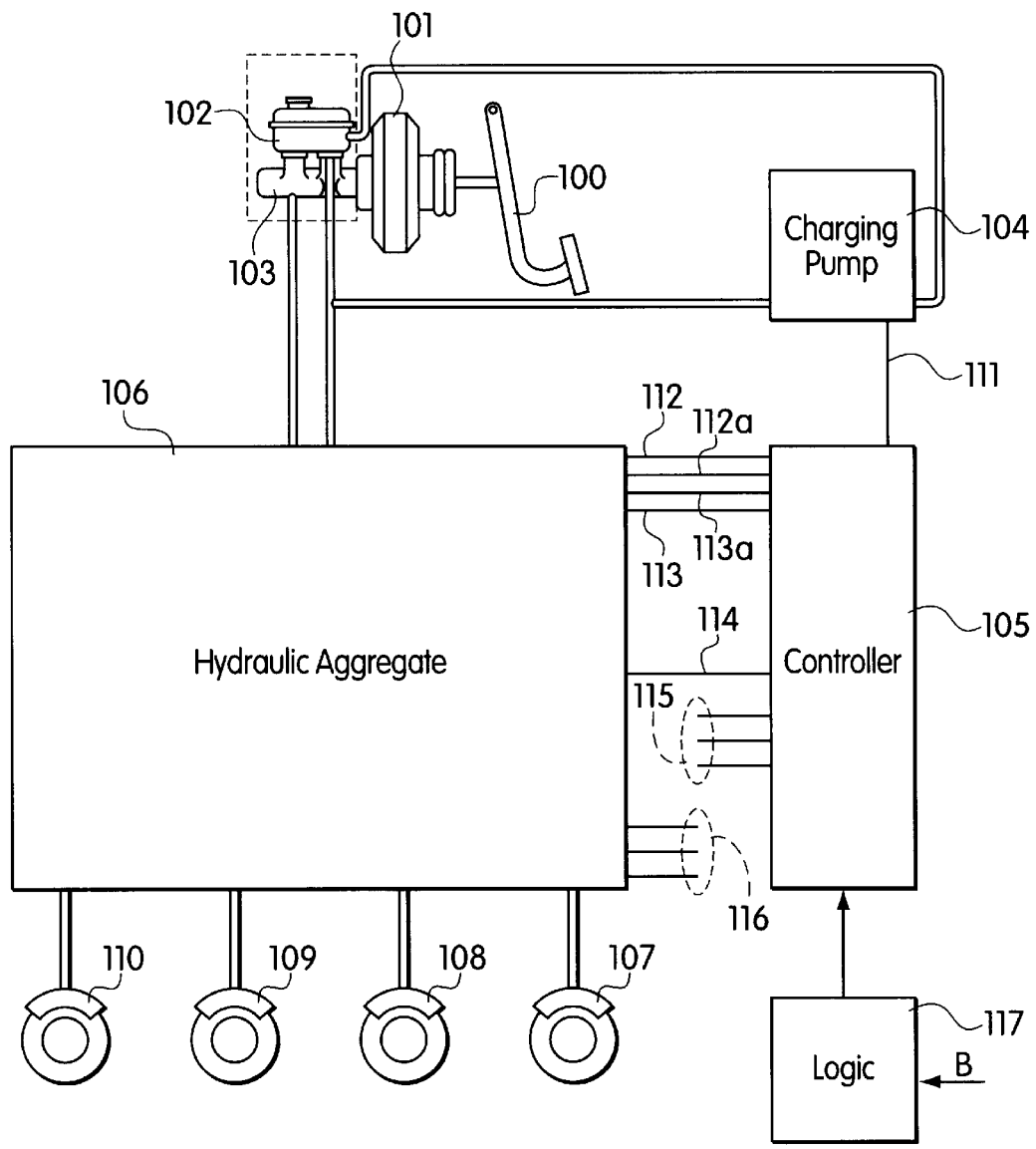
FIG. 1 shows a vehicle braking system including controller and higher-ranking logic according to the present invention.

FIG. 1 shows a hydraulic vehicle braking system, having a controller 105 and a higher-ranking logic 117 (e.g., antilock braking system, traction control system, dynamic movement control system), in which the driver feeds braking input B into the entire braking system by way of brake pedal 100. Brake pedal 100 is connected by a piston rod, for example, by way of a brake booster 101, to master brake cylinder 103. A reservoir 102 is connected to master brake cylinder 103, which here is dual-circuit. A charging pump 104 is interconnected via a line for the pressurized medium. The charge line of charging pump 104 opens through into a master brake line which, for a first brake circuit, emanates from a connection of the master brake cylinder and runs into hydraulic aggregate 106. From a further connection of master brake cylinder 103, a second master brake line for a second brake circuit likewise runs into hydraulic aggregate 106. Since charging pump 104 is connected via its charge line to only one brake circuit, a modified central valve is provided for master brake cylinder 103, whereby the second brake circuit can also be supplied with the pressurized medium delivered by charging pump 104. Due to a dividing piston located between the brake circuits in the master brake cylinder, the boost pressure built up by the pressurized medium and the charging pump is effective in the second brake circuit as well. On the other hand, it is also possible to provide a charging pump for each brake circuit, which means the central valve is no longer modified to allow the action of the respective charging pump to reach the respective other brake circuit. Hydraulic aggregate 106 is connected to wheel brakes 107 through 110 via lines for carrying the pressurized medium. Information concerning the position of the respective wheel brake is intentionally not given, since no specific arrangement is necessary for the present invention.

Rather, all conventional brake-circuit distributions—parallel or X, as well as single-wheel braking, etc.—can be used.

The controller belonging to the device is shown schematically as block 105. Connected, inter alia, to controller 105 are, first of all, the individual valves in hydraulic aggregate 106, and secondly, the motors of the individual pumps used in the braking system. The charging pump or its motor is driven by controller 105 via a control line 111. A motor of at least one return pump is controlled via control line 114. The precharging valves of the brake circuits can be actuated using lines 112 and 112a, respectively. The selector valves of the brake circuits are driven using lines 113 and 113a. Remaining control lines and connections, known to one skilled in the art, such as for actuating the intake and discharge valves of the individual wheel brakes are combined by way of suggestion in one line bundle 115, and are not explicitly mentioned. By way of example, line bundles 115 and 116 are each drawn with three connections for further lines existing in the Related Art. However, the precise number of lines and connections depends upon the respective design of the braking system. Controller 105 likewise receives input variables from the possible antilock braking system and/or traction control system and/or dynamic movement control system logic 117. Accordingly, the input variables into controller 105 are first of all from higher-ranking logic 117, on the basis of a braking input B of the driver, and secondly, signals from block 106, e.g., of pressure sensors, etc., which are combined in the indicated line bundle 116. To simplify the representation, any circuit elements for driving the pump, such as for separating the pump motor from, or for connecting the pump motor to the supply voltage, are likewise integrated into the block of controller 105, and are not explicitly elaborated.

Figure 2:
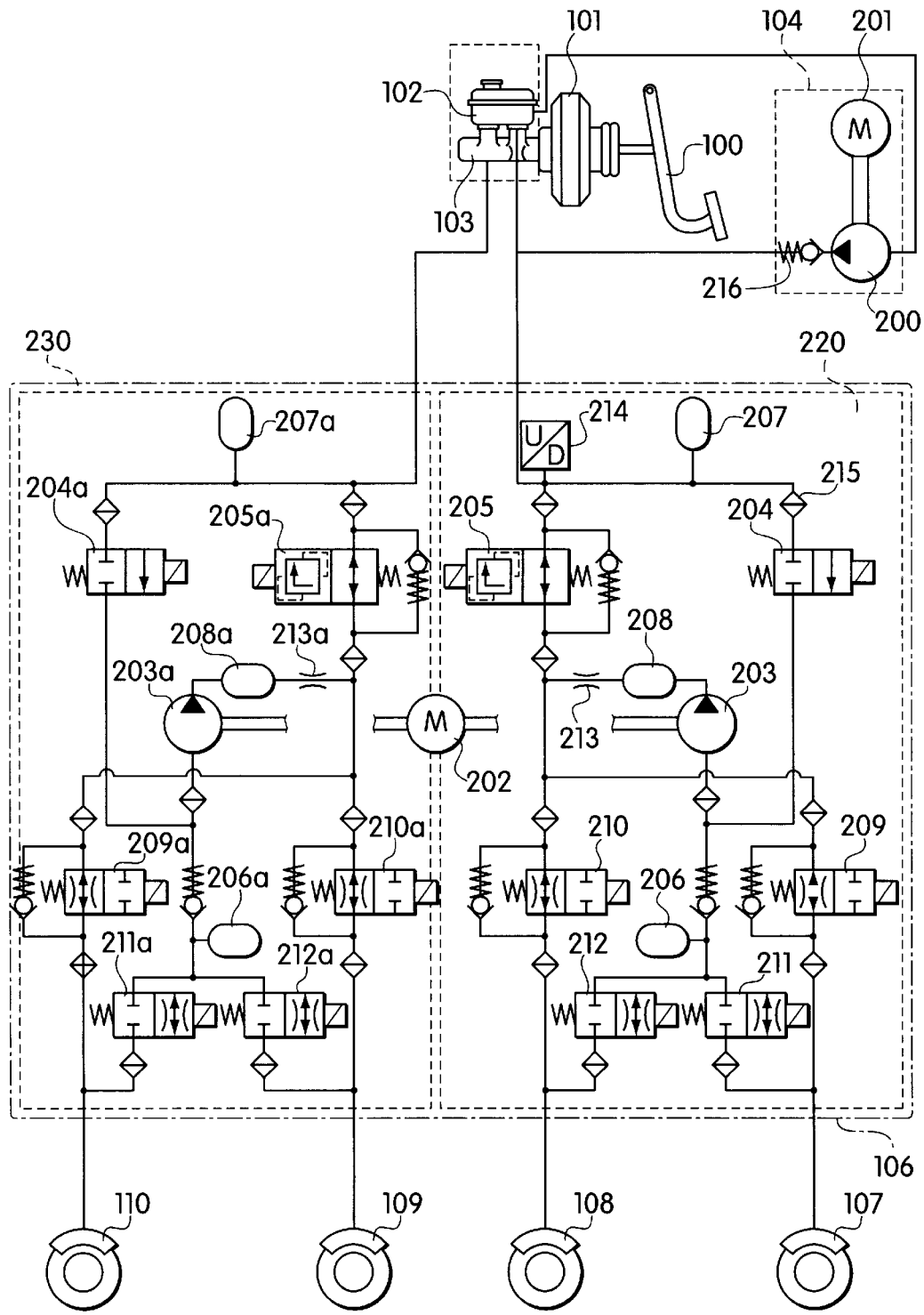
FIG. 2 shows a section from FIG. 1 in which the pre-charging pump and the arrangement of the two brake circuits are depicted in greater detail according to the present invention.

FIG. 2 shows a section from FIG. 1, the brake circuits and the charging pump being shown in greater detail. Here, block 104 for the charging pump from FIG. 1 is divided into a pump 200, the associated pump motor 201 and a safety valve 216. To attain greater clarity in the representation, all safety valves in FIG. 1 are realized in the form of check valve 216. However, this is not absolutely necessary according to the present invention, and thus, depending on the situation, different valves or valve combinations can be used in connection with this safety function. The hydraulic aggregate is again designated here by 106, separated into two brake circuits which are represented by 220 and 230. In the following, only one brake circuit is described in detail;

the analogous elements in the brake circuit which is not explicitly described are provided with identical numbers and the addition of "a". In the same way as safety valves 216, filters 215 used in FIG. 2 are not designated individually, but are simply combined under 215. The arrangement of the filters used here is likewise not essential; the filters can be placed as desired, according to the objectives of a given situation.

In brake circuit 220 to be described, a pressure sensor 214 is mounted at the master brake line. A storage chamber 207 is likewise located at the master brake line. The pressurized medium is introduced into the brake circuit via a precharging valve 204. For example, these controllable directional-control valves 204 and 204a are designed as electromagnetically controllable 2/2-way valves and are mounted between master brake cylinder 103 and return pump 203. Damping chamber 208 is adjacent to return pump 203 on the output side. Restrictor 213 follows in the direction toward master brake cylinder 103, as well as toward the respective brake-pressure build-up valves, thus intake valves 209, 209a into the wheel brakes. The exit of the pressurized medium from the brake circuit is controlled by way of a combination of the selector valve and pressure-limiting valve 205. In the future, this combination is only designated as selector valve 205. Selector valve 205 can be circumvented by a check valve, so that when there is a switch to automatic brake operation, in response to sufficient actuation of brake pedal 100, pressure from master brake cylinder 103 can be transmitted to the valve arrangements for brake-pressure modulation 209–212. Of these brake valve arrangements, 209 and 210 are designated as intake valves of the respective wheel-brake cylinder, and 211 and 212 are each designated as discharge valves. Furthermore, a pressure reservoir 206 is mounted at the pressure-media line which runs from discharge valves 211 and 212 to return pump 203. Return pump 203 itself is actuated by a motor 202.

The sensor suite which is not essential for the present invention, such as wheel-speed sensors, etc., supplying the input variables for, e.g., the higher-ranking logic 117 in FIG. 1, is omitted in FIG. 2. The respective pump motors 202 and 201, and the indicated valves and valve arrangements are driven here by controller 105 from FIG. 1. However, the block for controller 105 and the higher-ranking logic 117 from FIG. 1, or their functionalities, can expediently be combined in one control unit as well.

Figure 3:
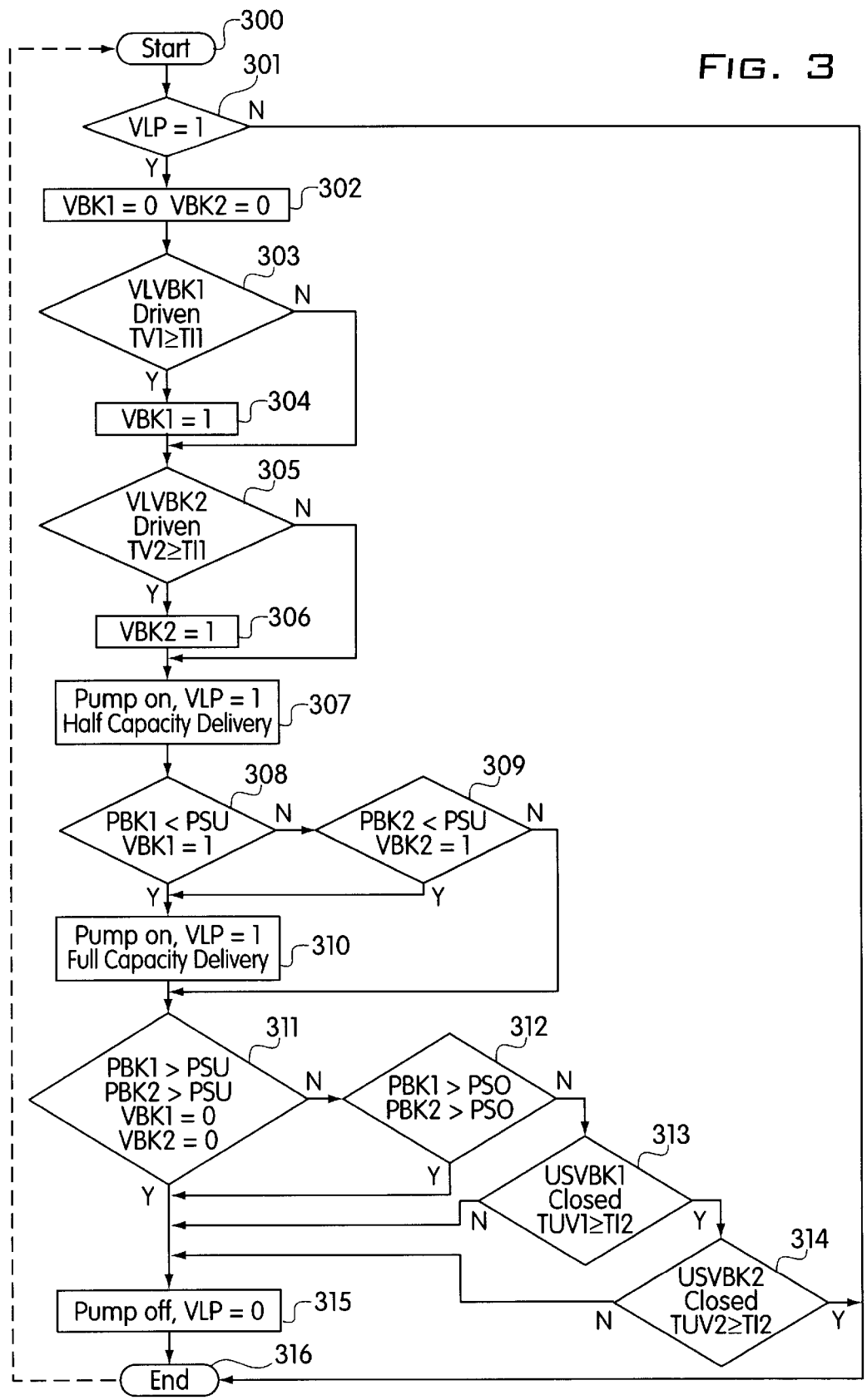
FIG. 3 shows a flow chart illustrating a method of the present invention in an exemplary embodiment having two brake circuits.

The functioning method of the device shown in FIG. 1 and of the method of the present invention are elucidated with the aid of a flow chart in FIG. 3. The program sequence shown can be implemented equally as a hard-wired logic or in the form of a software program in a computer. In block 300, the start of the formation and/or adaptation of the driving signal for the pump is carried out. At the same time, it is also advisable in block 300 to predefine variables such as a lower pressure threshold PSU and/or an upper pressure threshold PSO, as well as valve driving times TI1 and/or TI2 as threshold values, so that, in addition to a fixed input, these variables can also be set individually for each program run, and thus can be supplied in a variable manner.

In block 301, it is subsequently checked whether a closed-loop braking-torque control, e.g., for traction control system or dynamic movement control system, is being demanded by the higher-ranking logic. In the same way, it is checked whether a precharge of the hydraulic aggregate synonymous with VLP=1 is needed. The conditions under which this is the case are explained in the following. During the first run of the program sequence, it is standard to assume that a precharge is necessary, and thus VLP=1. If a precharge of the hydraulic aggregate, which is synonymous with switching on charging pump 104, is not necessary, or no closed-loop braking-torque control is demanded, then the run is terminated and one arrives at block 316. In the other case, thus when a precharge is needed, it is first determined in block 302 that initially no volume intake should take place in the two brake circuits, i.e., VBK1=VBK2=0. This is used exclusively for initializing, because in the following, a possible volume intake of each individual brake circuit, and the delivery rate of the pump necessary for that, should first be determined from the driving signals of the valves and the pressure ratios in the respective brake circuit. To that end, it is checked in query 303 whether the precharging valve of brake circuit 1, VLVBK1 204, is being driven, and thus whether current is flowing through it longer than a predefinable time TI1. If it is in fact being driven, thus current is flowing through it for a valve driving time TVI greater than threshold value TI1, or it is already completely in the open position, this is characterized by the fact that a volume intake of brake circuit 1 should take place, which in block 304 is stipulated as VBK1=1. If precharging valve VLVBK1 204 of brake circuit 1 220 is closed or is not driven for a sufficiently long time (TV1<TI1), it is assumed that such a volume intake of the brake circuit is not provided, and one arrives at query 305, bypassing block 304, which means VBK1=0 continues to be true. Analogous to query 303, in query 305, it is checked whether precharging valve 204a of brake circuit 2 230 is in the open position. If current is flowing through it for longer than TI1 (TV2>TI1), i.e., it is about to open or is already completely open, in block 306, the volume intake for brake circuit 2 230 is established by VBK2=1 here as well. In the other case, when precharging valve 204 or 204a is not being driven, or current is flowing through it for a shorter time than TI1, then no volume should be taken up in the brake circuit.

Dependent upon the position of the precharging valves, characterized by the signal driving these valves, it is thus established whether volume should be taken up or not. For that purpose, in the simplest case, a predefinable time TI1=0 ms is assumed. Then the mere existence of a signal for driving the valves, regardless of its duration, already indicates that volume should be taken up. Dependent on the design, however, a higher time threshold TI1 can also be useful.

In each of the preceding cases, in block 307, the pump is switched on at half capacity, and thus VLP=1 is set, in order to permit a smooth transition of the pump rate. Here, three pressure levels of the pressurized medium in the brake circuit are used. In a lower pressure range, characterized by a lower pressure threshold PSU, the pressurized medium is delivered at full delivery rate 310. In an upper pressure range, characterized by an upper pressure threshold PSO, the pressure in the pressurized medium is sufficient for the brake-pressure build-up, and the pump can be switched off 315. In a middle pressure range between pressure thresholds PSU and PSO, the pump delivers at half capacity 307, and therefore the half delivery rate adjusted here is used to keep a possible sudden change in the delivery of the pressurized medium during a transition into another pressure range, small. If a different number of pressure thresholds are quite suitably used, then at this point, the pressurized medium will possibly also be delivered with a delivery rate other than the half delivery rate.

However, under certain conditions which are explained hereinafter, the pump is possibly switched off again immediately. In block 307, VLP is set to 1, and therefore indicates that the pump is switched on and a precharge of the hydraulic aggregate is needed. In query 308, it is now checked whether the pressure in brake circuit 1 PBK1 is below the lower pressure threshold PSU. At the same time, a second condition must be met, namely, that a volume intake in brake circuit 1 is provided, characterized by VBK1=1. The latter is synonymous with the fact that the precharging valve of brake circuit 1 204 is open, or is being driven longer than TI1, so that a volume intake is taking place in brake circuit 1 220.

Brake-circuit pressure PBK1 and PBK2, respectively, can be acquired in various ways. It is either detected by a pressure sensor, estimated with the aid of a model, or determined from a family of characteristics, etc.

If brake-circuit pressure PBK1 falls below lower pressure threshold PSU and if precharging valve VLVBK1 204 is driven longer than TI1, thus VBK1=1 and therefore a volume intake into brake circuit 1 is also possible, the pump in block 310 is immediately operated at full capacity. If at least one condition from query 308 is not met, both conditions are checked in query 309 for brake circuit 2 in an analogous manner. Thus if for it least one brake circuit, the brake-circuit pressure falls below a predefinable lower pressure threshold PSU, and if in at least one brake circuit, a precharging valve 204, 204a is open or current is flowing through it longer than TI1, thus a volume intake provided with VBK1=1 or VBK2=1, then the pump is operated at full capacity 310. If this is not true, the pump continues to run at half capacity.

In query 311, it is now checked whether the two brake-circuit pressures PBK1, PBK2 are above the lower pressure threshold PSU, and the precharging valves of both brake circuits 204, 204a are closed, and therefore VBK1=VBK2=0. If this is the case, it is assumed that no volume intake is necessary by brake circuits 220, 230. In block 315, the pump is thereupon switched off and VLP=0 is set.

If one of the conditions in query 311 is not met, it is checked in block 312 whether the two brake-circuit pressures PBK1, PBK2 are above the upper pressure threshold PSO. If the pressures in both brake circuits PBK1, PBK2 are above the upper pressure threshold PSO, then the pump is likewise switched off, since in this upper pressure range, the pressure in the pressurized medium is sufficient for the brake-pressure build-up. However, if this is not true, on the basis of selector valves USVBK1 205 and USVBK2 205a, respectively, it is checked in block 313 or 314 in FIG. 3 whether the pump can nevertheless be switched off. If at least one of the two selector valves 205, 205a of brake circuits 220, 230 is open or still in a driving phase during which these selector valves are not completely closed, then the pump is likewise switched off in block 315 and VLP=0 is set. Selector valves USVBK1 and USVBK2, respectively, are first completely closed or in the pressure-limiting position when current has flowed through them longer or equally as long as a time TI2 which is predefinable and/or is a function of the type and construction of the valve (TUV1>TI2 and TUV2>TI2, respectively). If both selector valves 205, 205a are closed, the pump remains in the operating state which it held previously, thus switched on at half or full delivery rate, and one arrives at block 316, the end of the program. If selector valves 205, 205a are partially or completely open, thus current flows through them for a shorter time than TI2, it is assumed that pressure should be reduced. Then charging pump 104 can be switched off, or also expediently, only be reduced in its capacity. However, in the embodiment used by way of example, charging pump 104 is switched off in block 315, therefore the delivery rate is reduced to zero.

From block 315, the end of the program, the program is started anew. With each repeated run-through, variables VLP, VBK1 and VBK2 from the last run-through are then predefined. The run time for a program run-through can usefully be coordinated with driving time TI2 of the selector valves until they are completely closed.

Useful Additions and Special Features

Figure 4:
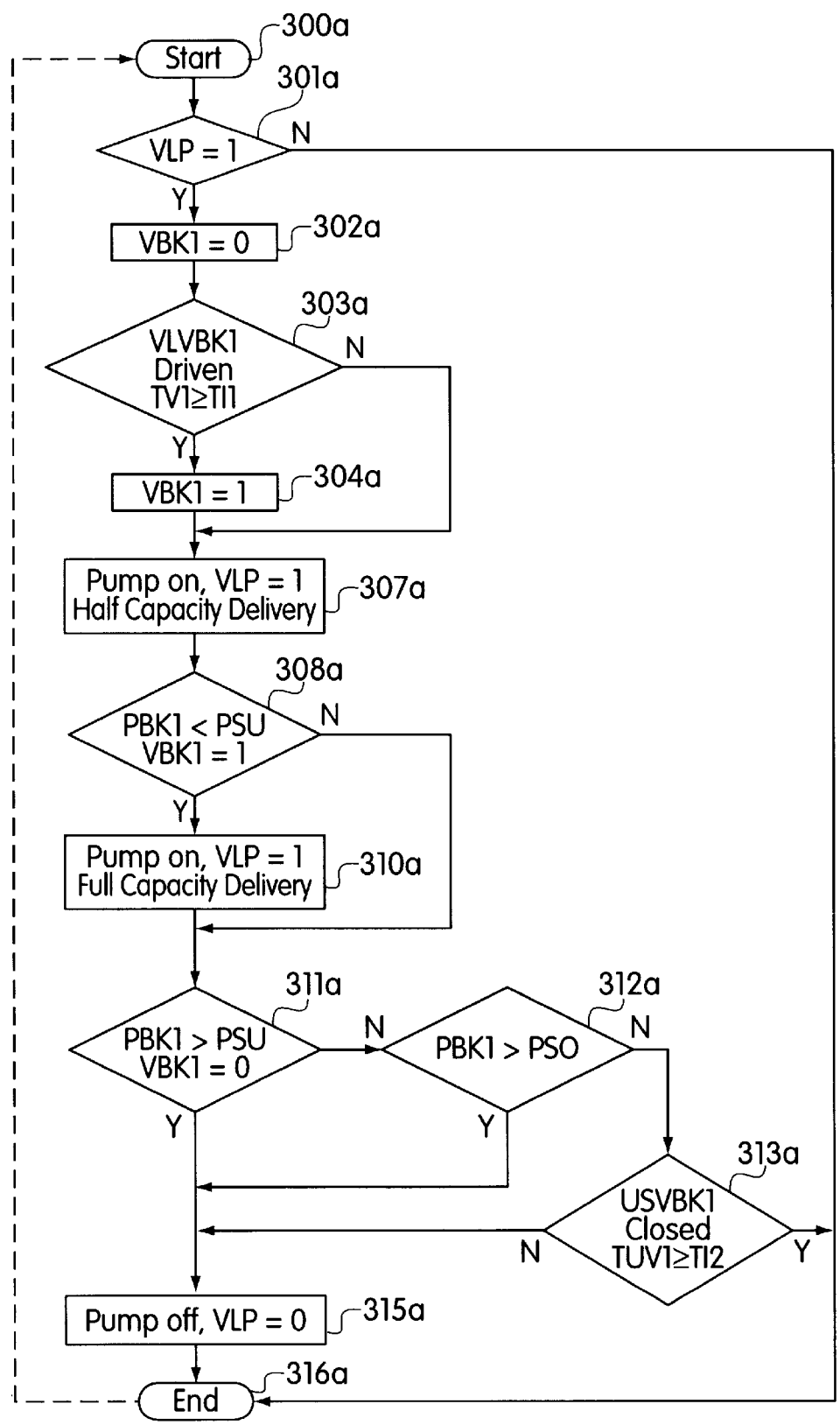
FIG. 4 shows a flowchart illustrating the application of the present invention with respect to one brake circuit.

Besides the use of one charging pump 104 for two brake circuits 220, 230 and the flow chart in FIG. 3 resulting therefrom, it is also possible to use one pump per brake circuit, which means the flow chart in FIG. 3 is divided into two programs. The conditions can then be expediently queried separately in each brake circuit, and therefore the pumps can also be driven separately. In FIG. 4, this is shown by way of example for brake circuit 1. The procedure is analogous with brake circuit 2 and possibly any further brake circuit. The individual blocks of the flow chart in FIG. 4 are analogous in their function to those in the description of the exemplary embodiment in FIG. 3, and therefore only differ from these by the addition of "a". Exceptions are blocks 302a, 311a and 312a, in which the conditions and initializings pertaining to brake circuit 2 are removed.

The number of pressure ranges used can usefully be selected depending on the employment of the pump and depending on the situation. A multitude of different pressure ranges, by using a great number of pressure thresholds, for example, and/or the use of a characteristic curve or a family of characteristics, ensures an even smoother transition from one pressure range to another, and the utilization of the information from the valve-driving signals and/or their formation ensures that the pump is driven in a manner adapted to the capacity.

The predefinable times as threshold values TI1 and TI2 for driving the valves can generally, but particularly given a separation of the brake circuits by using one pump per brake circuit, be selected in a manner specific to the brake circuit and therefore differently in each case.

Expediently, it is possible to establish several different driving times per shut-off device (e.g., TI1, TI1n, etc.) as threshold values, it then also being possible to assign different pump delivery rates to these different threshold values which result in different valve positions or different opening cross-sections of the shutoff devices.

Just as with the pressure ranges, a great number of time-related threshold values, and thus many different driving times, also permit a smoother transition. In using a characteristic curve or a family of characteristics, a continuous transition of the driving times of the shut-off devices, and thus of the delivery rates of the means which is/are delivering the pressurized medium, is then also possible.

The activation according to the present invention, disclosed in the exemplary embodiment for at least one charging pump 104 in conjunction with precharging valve 204 and selector valve 205, is advantageously also applicable to, for example, return pumps 203 with 202 in conjunction with intake valves 209, 210 and discharge valves 211,212. In this context, however, for the case when, for example, the discharge valve is open, the pump is not generally switched off, but rather is driven as a function of the information derived from the driving signal of the discharge valve, e.g., at reduced delivery rate. At the same time, however, an open discharge valve likewise indicates the input to reduce pressure. The information from the driving signal of the shut-off devices and/or the formation of the driving signal is evaluated in an analogous manner in the case of a storage pump in conjunction with at least one intake valve and discharge valve in an electrohydraulic braking system. Thus, the method is transferable to different braking systems and to their means for delivering the pressurized medium, as well as to their shut-off devices.

What is claimed is:

1. A method for at least one of forming and adapting of a driving signal for driving a device for delivering a pressurized medium of a braking system, comprising the steps of:
   (a) providing shut-off devices for at least one of an inlet, an outlet and a passage of the pressurized medium;
   (b) adjusting a pressure of the pressurized medium via the device for delivering the pressurized medium; and
   (c) determining the at least one of forming and adapting of the driving signal as a function of at least one of (1) at least one driving signal of the shut-off devices and (2) a formation of the at least one driving signal of the shut-off devices.

2. The method according to claim 1, wherein the device for delivering the pressurized medium includes at least one pump.

3. The method according to claim 1, wherein the shut-off devices include at least one valve.

4. The method according to claim 1, further comprising the steps of:
   (d) determining the at least one of forming and adapting of the driving signal as the further function of the pressure of the pressurized medium of the braking system; and
   (e) adjusting a delivery rate of the device for delivering the pressurized medium based upon steps (c) and (d).

5. The method according to claim 1, further comprising the steps of:
   (d) measuring an opening cross-section of at least one of the shut-off devices via a time duration of the driving signal of the at least one shut-off device; and
   (e) achieving and determining different opening cross-sections by predefining different driving-time durations for the shut-off devices.

6. The method according to claim 5, further comprising the steps of:
   (f) attaining and monitoring at least one of the different driving-time durations and the different opening cross-sections via predefining at least one time-related threshold value; and
   (g) attaining a continuous transition of the opening cross-sections by replacing threshold values with at least one of a characteristic curve and a family of characteristics.

7. The method according to claim 4, further comprising the steps of:
   (f) differentiating and determining various pressure ranges for the pressure in the pressurized medium; and
   (g) allocating to each pressure range at least one of a predefinable delivery amount of the pressurized medium and a predefinable delivery rate by the device for delivering the pressurized medium.

8. The method according to claim 7, further comprising the steps of:
   (h) attaining and monitoring at least one of the various pressure ranges of the pressure in the pressurized medium and different predefinable delivery rates by using at least one predefinable pressure threshold value; and (i) achieving a continuous transition of the delivery rates by replacing pressure threshold values with at least one of a characteristic curve and a family of characteristics.

9. The method according to claim 1, further comprising the step of:

(d) determining a predefinable delivery rate of the device for delivering the pressurized medium as a function of at least one of (1) the pressure of the pressurized medium and (2) a time duration of the at least one driving signal of the shut-off devices.

10. A method for at least one of forming and adapting of a driving signal for driving at least one of (A) at least one first device for delivering a pressurized medium of a braking system and (B) at least one second device for delivering the pressurized medium of the braking system, comprising the steps of:

providing shut-off devices for at least one of an inlet, an outlet and a passage of the pressurized medium;

adjusting a pressure of the pressurized medium in each brake circuit in the braking system via the at least one first device for delivering the pressurized medium, each brake circuit having at least one of the at least one first device;

adjusting the pressure of the pressurized medium in any of the brake circuits in the braking system via the at least one second device, the at least one second device precharging at least one of the at least one first device with the pressurized medium; and determining the at least one of forming and adapting of the driving signal as a function of at least one of (1) at least one driving signal of the shut-off devices and (2) a formation of the at least one driving signal of the shut-off devices.

11. The method according to claim 10, wherein the at least one first device includes a return pump.

12. The method according to claim 10, wherein the at least one second device includes a charging pump.

13. A device for at least one of forming and adapting of a driving signal for driving an arrangement for delivering a pressurized medium of a braking system, the arrangement for delivering the pressurized medium adjusting a pressure of the pressurized medium, the braking system including shut-off devices for at least one of an inlet, an outlet and a passage of the pressurized medium, the device comprising:

a drive element for at least one of forming and adapting of the driving signal as a function of at least one of (1) at least one driving signal of the shut-off devices and (2) a formation of the at least one driving signal of the shut-off devices.

14. The device according to claim 13, wherein the arrangement for delivering the pressurized medium includes at least one pump.

15. The device according to claim 13, wherein the shut-off devices include at least one valve.

16. The device according to claim 13, wherein the at least one of forming and adapting of the driving signal is a further function of a pressure in the pressurized medium of the braking system, and wherein, based on the driving signal, a delivery rate of the arrangement for delivering the pressurized medium is adjusted.

* * * * *